Figures 1, 2:
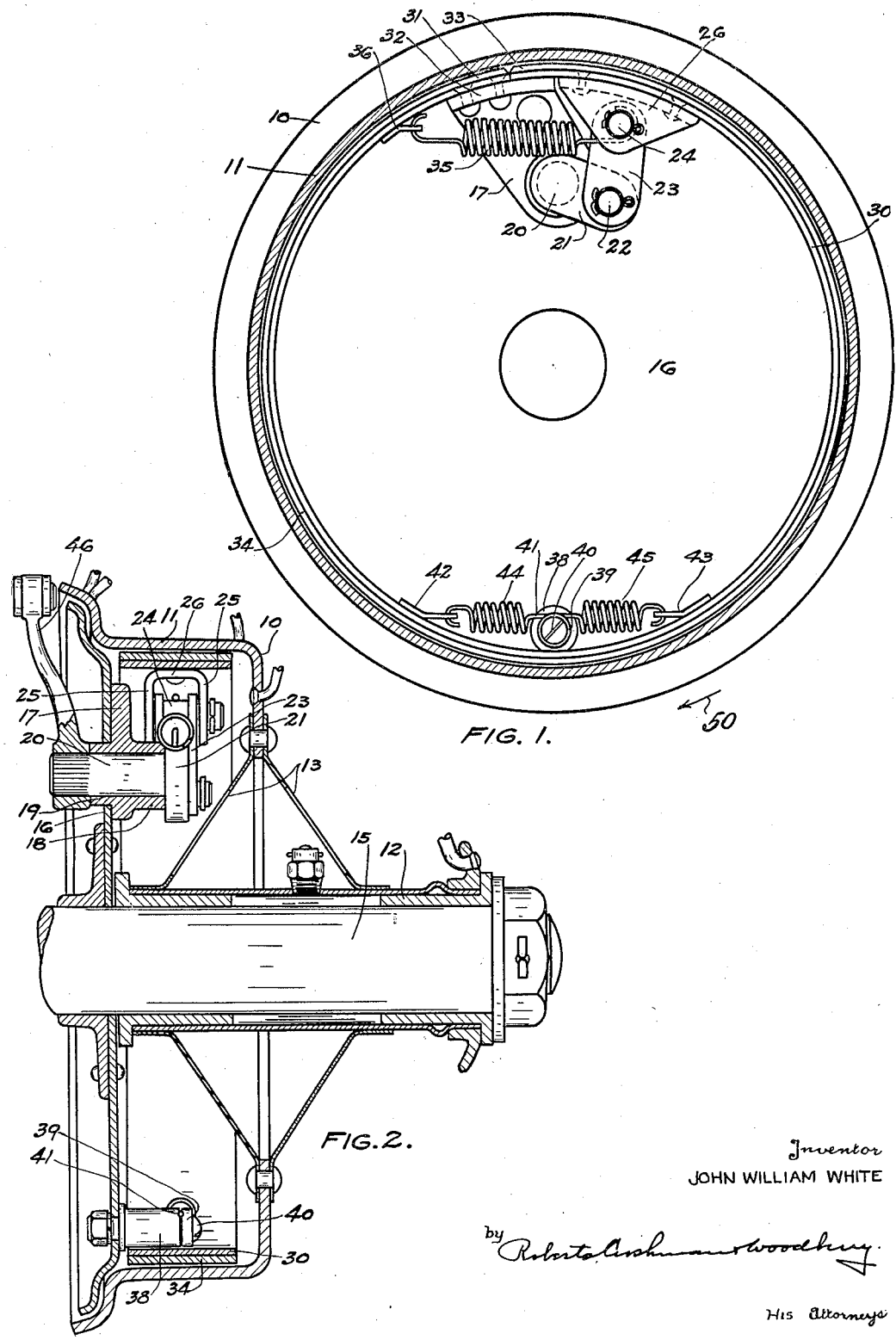

June 27, 1933.  J. W. WHITE  1,915,637
BRAKE MECHANISM
Filed June 12, 1929

Inventor
JOHN WILLIAM WHITE by Roberts Cushman Woodbury

His Attorneys

Patented June 27, 1933

1,915,637

UNITED STATES PATENT OFFICE

JOHN WILLIAM WHITE, OF BUFFALO, NEW YORK

BRAKE MECHANISM

Application filed June 12, 1929. Serial No. 370,170.

This invention relates to an improvement in a brake mechanism more particularly in a brake of the single shoe type which functions by means of a self-energizing or servo action.

The primary object of this invention is to provide a brake of the single shoe type having a minimum number of parts and in which the brake band is positively anchored at one end only. Another object of this invention is to provide in the brake an anchor which is rigidly secured to one end of the brake band, the other end being free and which functions as a support for the free end of the brake band. A further object of this invention is to provide a brake of the single shoe type in which the brake band is applied by a single radially moving element attached to one end thereof and is withdrawn from the functioning position by the action of such element and of means located substantially diametrically opposite the element.

Other objects of the invention will appear to one skilled in the art from the following specification taken in connection with the drawing forming a part thereof and in which:

Fig. 1 is a side elevation of a brake mechanism embodying this invention, certain parts being broken away for the purpose of clarity; and Fig. 2 is a transverse sectional view of such brake mechanism showing such mechanism mounted upon a wheel of the airplane type.

In the drawing, the reference numeral 10 designates a brake drum having a braking surface 11 and suitably secured in any desired manner to the rotating part of a wheel. In the embodiment illustrated in the drawing the drum 10 is secured to the hub 12 of a wheel of the airplane type by means of a pair of braces 13. Mounted upon the axle 15 is a brake flange 16 which acts as a support for the brake applying elements and for the brake band. It is understood, however, that the present invention is by no means limited to this particular use and that a brake made in accordance with this invention is applicable to any type of wheel or rotating member and will function to retard a rotating movement.

Rigidly secured to the inner face of the brake flange 16 is an angle bracket 17 having a boss 18 and a central opening 19 through which extends a rod 20. Attached to the outer end of the rod 20 is one end of an arm 21, the other end carrying a pin 22 which enters an opening in one end of a link 23. The other end of the link 23 engages a stub shaft 24 which is supported by the opposite sides 25 of a U-shaped member 26 preferably a stamping.

The ends of the brake band 30 are secured by rivets or similar means to the bracket 17 or brake anchor, and to the member 26 or brake shoe. The end 31 of the band rests upon the flange 32 of the bracket and the end 33 hereinafter designated and referred to as the free end, projects beyond the member 26 to such a distance that it rests upon the flange 32 and, when the parts are in the idle position shown in Fig. 1, abuts the end 31. The brake band 30 is preferably provided with a brake lining 34 of the usual type and the bracket 17 is so located that the end 31 of the brake band secured to the flange 32 is held out of contact with the braking surface 11 of the drum at all times. A spring 35 attached at one end to a clip 36 on the brake band and at the other end to the stub shaft 24 normally acts to hold the parts in the idle position shown in Fig. 1, in which the end 33 of the brake band rests against the flange 32 of the bracket, the ends of the band 30 abutting and the entire brake lining being out of contact with the braking surface 11 of the drum.

As a means for holding the center of the brake band 30 in proper position there is rigidly bolted to the flange 16 at a point substantially diametrically opposite the bracket 17 a post 38 against which a washer 39 is held by a screw 40. A double spring 41 attached at one end to a clip 42 and at the other end to a similar clip 43, both clips being carried by the brake band, is clamped between the washer 39 and post 38, as shown particularly in Fig. 2. The coils 44, 45 of the spring 41 are located on opposite sides of the post 38 and function independently but coact and normally tend to hold the center of the brake band away from the braking surface 11.

A suitable brake lever 46 is attached to the inner end of the rod 20 and is adapted to be actuated in any manner desired. When the brake is applied, the rod 20 is rotated and the arm 21 transmits its movement to the link 23 which in turn acts upon the member 26. The member 26 is thus carried radially away from the center of the drum and the brake lining at the free end 33 of the band is brought into contact with the braking surface 11, being carried away from the end 31 of the band and the bracket 17. Assuming that the wheel is rotating in the manner indicated by the arrow 50, it must follow, since the member 26 holds the end of the band against the braking surface, that the other portions of the brake band will wrap against the drum until the brake lining comes into contact with the braking surface 11 of the drum throughout substantially the entire length of the brake band. The member 26 pivots on the pin 22 and thus permits the necessary longitudinal movement of the band. This wrapping action of the brake band is resisted by the springs 35 and 41, but owing to the urge exerted by the rotating body the spring 35 and coil 44 will expand and permit such movement.

If the body be rotated in the direction opposite to that indicated by the arrow 50 the same function will take place with the exception that the coil 45 will be placed under tension rather than the coil 44. The longitudinal movement of the brake band caused by this action of the band will be limited by the contrast of the ends of the band. As soon, however, as the brake is released the member 26 will be returned to its normal position by the lever 46 and spring 35 and the free end 33 of the band will be brought to rest upon the flange 32 with its end in abutment with the end 31. At the same time the coils 44 or 45 will withdraw the center of the brake band from any functional contact with the brake drum.

It will be noted that the member 26 which constitutes the shoe by which pressure is applied to the band is located adjacent to the anchoring bracket 17 and moves in substantially a radial direction, the spring 35 counteracting any tendency that might be exerted by the link 22 to move the member in other than a radial movement. The radial movement of the member 26 is terminated when the lining at the end 33 of the band comes into contact with the braking surface, and its operation is the same whether the lining be thin or thick the only difference being that with a thinner lining, the radial movement of the shoe will be through a longer distance. It will also be noted that the brake band is of the full floating type anchored at the end 31 alone, and that the anchoring bracket 17 supports both ends of the band.

The member 26 being secured to the free end of the band thus reinforces such end and distributes the pressure when that end of the band is brought into contact with the drum and in place of the member 26 other forms of reinforcing means might be provided.

While certain features of this invention have been described in detail it must follow that the other features which are to all intents and purposes equivalents thereto come within the spirit and scope of the invention as set forth in the following claims.

I claim:

1. A brake mechanism comprising a brake drum, a brake band within the drum, an anchor to which one end of the band is secured the other end being free, a member pivotally supported upon said anchor and secured to the band adjacent its free end, the free end of the band resting upon the anchor and abutting its other end when idle and means for causing said member to carry the free end of the brake band radially away from the anchor and into contact with said brake drum.

2. A brake mechanism comprising a brake drum, a brake band located within the drum having the free end portions thereof located in close proximity in the released position of the band, means fixed relative to the drum for supporting the said ends, means for securing one of the ends to said supporting means, and means operatively connected to one of the ends for expanding the band against the braking surface of the drum.

3. A brake mechanism comprising a brake drum having a circular brake flange, a bracket fixed within the drum having a surface spaced inwardly from the inner surface of the brake flange and arranged substantially concentric therewith, a brake band also located within the drum having the free ends thereof seated upon the surface aforesaid of the bracket in close proximity to each other, means for rigidly securing one of said end portions to the bracket, and means operatively connected to the other of said end portions for expanding the band against the braking surface of the drum.

4. A brake mechanism comprising a brake drum having a circular brake flange, a bracket rigidly secured within the drum having a surface spaced inwardly from the brake flange in concentric relation thereto, a brake band located within the drum having the free end portions contacting with each other in the released position of the band and seated upon the surface aforesaid of the bracket, means normally urging the end portions of said band into engagement with each other, means for rigidly securing one of the end portions of the band to the bracket, and means operatively connected to the other end of said band for expanding the latter against the brake flange.

5. A brake mechanism comprising a brake drum having a circular brake flange, a bracket rigidly secured to the drum within the latter and having a bearing surface spaced inwardly from the inner surface of the flange in concentric relation therewith, a band located within the drum having the free end portions contacting with each other in the released position of the band and seated upon said bearing surface, means for fixedly securing one of the ends of the band in overlapping relation with a portion of said surface, and means for expanding the band into engagement with the brake flange.

Signed by me at Buffalo, New York, this 7th day of June 1929.

JOHN WILLIAM WHITE.